(12) United States Patent
Nothum, Jr.

(10) Patent No.: US 11,432,579 B2
(45) Date of Patent: Sep. 6, 2022

(54) INTERNAL WASHING PROVISIONS FOR FOOD PROCESS LINE MACHINES

(71) Applicant: Robert G. Nothum, Jr., Willard, MO (US)

(72) Inventor: Robert G. Nothum, Jr., Willard, MO (US)

( * ) Notice: Subject to any disclaimer, the term of this patent is extended or adjusted under 35 U.S.C. 154(b) by 0 days.

(21) Appl. No.: 16/911,866

(22) Filed: Jun. 25, 2020

(65) Prior Publication Data

US 2022/0151281 A1    May 19, 2022

Related U.S. Application Data

(63) Continuation-in-part of application No. 15/940,003, filed on Mar. 29, 2018, now Pat. No. 10,889,444.

(Continued)

(51) Int. Cl.
| | | |
|---|---|---|
| *A23P 20/12* | (2016.01) | |
| *B65G 17/12* | (2006.01) | |
| *B65G 21/08* | (2006.01) | |

(52) U.S. Cl.
CPC .............. *A23P 20/12* (2016.08); *B65G 17/12* (2013.01); *B65G 21/08* (2013.01); *B65G 2201/0202* (2013.01)

(58) Field of Classification Search
CPC .......... A23P 20/12; A23P 20/13; A23P 20/17; B65G 21/08; B65G 17/12;
(Continued)

(56) References Cited

U.S. PATENT DOCUMENTS 3,689,958 A * 9/1972 Dillon ................ A22C 21/0007
                                                          99/517
4,132,156 A    1/1979 Glaze, Jr. ................ B31B 50/00
(Continued)

FOREIGN PATENT DOCUMENTS

DE    10 2004 062 137    2/2006    .............. A23G 3/20
DE    20 2009 016 645    5/2011    ............. B65G 47/08
(Continued)

OTHER PUBLICATIONS

NL Search Report, Appln. No. NL 2020691 dated Jan. 15, 2019.

*Primary Examiner* — Sarang Afzali
*Assistant Examiner* — Darrell C Ford
(74) *Attorney, Agent, or Firm* — Jonathan A. Bay

(57) ABSTRACT

Food process-line coating apparatus for coating a stream of food product in a food process line are provided with the improvement of a permanently-installed internal cleaning-fluid circuit and a plurality cleaning-fluid distribution devices. The cleaning-fluid distribution devices are any of a rotary spray head, a spherical spray nozzle, a rotary frame or a tubular (cylindrical) rotary manifold. The rotary spray head optionally has a multitude of flat spray nozzles mounted along the arms. The spherical spray nozzle might be mounted on a columnar base, and a plurality of those might stand like pickets and aimed a laterally-extending target, like a conveyor belt's nose roller. The rotary frame might have a spaced pair of parallel manifold tubes that rotate about a common axis. The tubular (cylindrical) rotary manifold preferably has a multitude of ports or nozzles distributed at spaced locations on its outer sidewall.

9 Claims, 13 Drawing Sheets

Related U.S. Application Data

(60) Provisional application No. 62/866,124, filed on Jun. 25, 2019, provisional application No. 62/648,613, filed on Mar. 27, 2018, provisional application No. 62/577,375, filed on Oct. 26, 2017, provisional application No. 62/560,392, filed on Sep. 19, 2017, provisional application No. 62/545,634, filed on Aug. 15, 2017, provisional application No. 62/478,822, filed on Mar. 30, 2017.

(58) Field of Classification Search
CPC .............. B65G 2201/0202; A23G 1/54; A23G 3/0027; A23G 3/26; A23G 3/2076; A01N 59/16; A01N 2300/00; A01N 25/34; A61L 2/232; A23L 13/03; A01J 27/00; A01J 25/12; A22C 18/00
USPC .................. 99/352–356, 407–409, 485, 494; 118/13–31
See application file for complete search history.

(56) References Cited

U.S. PATENT DOCUMENTS

| | | | |
|---|---|---|---|
| 4,264,634 A | 4/1981 | Hochandel | A23P 20/12 |
| 4,281,757 A | 8/1981 | Morton | B65B 35/246 |
| 4,538,510 A | 9/1985 | Latimer | B54G 17/08 |
| 4,604,704 A | 8/1986 | Eaves | G06Q 10/08 |
| 4,852,475 A | 8/1989 | Yang | A47J 37/1214 |
| 4,856,453 A * | 8/1989 | Verrico | A23L 7/122 |
| | | | 426/305 |
| 4,966,072 A | 10/1990 | Ellis-Brown | A21B 1/48 |
| 5,129,353 A | 7/1992 | Koppens | A21C 9/04 |
| 5,172,636 A | 12/1992 | Theurer | E01B 27/10 |
| 5,546,848 A | 8/1996 | Naramura | A21C 9/04 |
| 5,741,536 A | 4/1998 | Mauer | A23B 4/0056 |
| 5,846,046 A | 12/1998 | Warburton | A01D 90/08 |
| 5,847,273 A | 12/1998 | Zubragel | G01F 13/003 |
| 5,881,639 A * | 3/1999 | Nesheim | A01J 25/12 |
| | | | 99/455 |
| 6,006,657 A * | 12/1999 | Ikuta | G07F 9/105 |
| | | | 222/1 |
| 6,902,089 B2 | 6/2005 | Carnevali | B60R 7/14 |
| 7,174,846 B2 | 2/2007 | Zeegers | A23P 20/12 |
| 7,954,446 B2 * | 6/2011 | Nakane | B05B 15/50 |
| | | | 118/DIG. 5 |
| 8,651,015 B2 | 2/2014 | Zhu | A23L 3/32 |
| 8,678,886 B1 | 3/2014 | Nothum, Jr. | A22C 25/08 |
| 8,816,223 B2 | 8/2014 | Taylor | A47J 37/12 |
| 10,471,619 B2 | 11/2019 | Hocker | B26D 5/007 |
| 10,653,157 B2 | 5/2020 | Shell | A22C 21/0053 |
| 10,834,947 B2 | 11/2020 | Rognini | A23L 13/03 |
| 11,019,829 B2 * | 6/2021 | Pfannenstiel | A22C 15/00 |
| 2002/0015635 A1 * | 2/2002 | Sinn | B65G 41/008 |
| | | | 414/346 |
| 2003/0008605 A1 * | 1/2003 | Hartford, Jr. | A22C 18/00 |
| | | | 452/52 |
| 2003/0079678 A1 | 5/2003 | Zeegers | B05C 19/04 |
| 2004/0123566 A1 | 7/2004 | Limousin | B65B 53/063 |
| 2006/0292271 A1 * | 12/2006 | King | A23G 3/2076 |
| | | | 426/235 |
| 2009/0223411 A1 * | 9/2009 | Higgins | D06M 13/51 |
| | | | 106/287.1 |
| 2009/0294246 A1 | 12/2009 | Pogue | B65G 17/28 |
| 2011/0311685 A1 | 12/2011 | Hogan et al. | A23C 19/00 |
| 2012/0070553 A1 | 3/2012 | Hockett et al. | A47J 37/12 |
| 2015/0053097 A1 | 2/2015 | Vardakostas | A23P 20/20 |
| 2015/0239591 A1 | 8/2015 | Bialy | B65G 37/00 |
| 2016/0088859 A1 | 3/2016 | Ream | A23G 4/18 |
| 2016/0167888 A1 | 6/2016 | Messina | B65G 41/00 |
| 2018/0186576 A1 * | 7/2018 | Torrenga | B65G 21/06 |
| 2020/0205461 A1 | 7/2020 | Cohen | A23P 20/12 |

FOREIGN PATENT DOCUMENTS

| | | | | |
|---|---|---|---|---|
| EP | 1 127 496 | 2/2000 | ............... | A23L 1/31 |
| EP | 2 481 295 | 8/2012 | ............... | A23L 1/00 |

\* cited by examiner

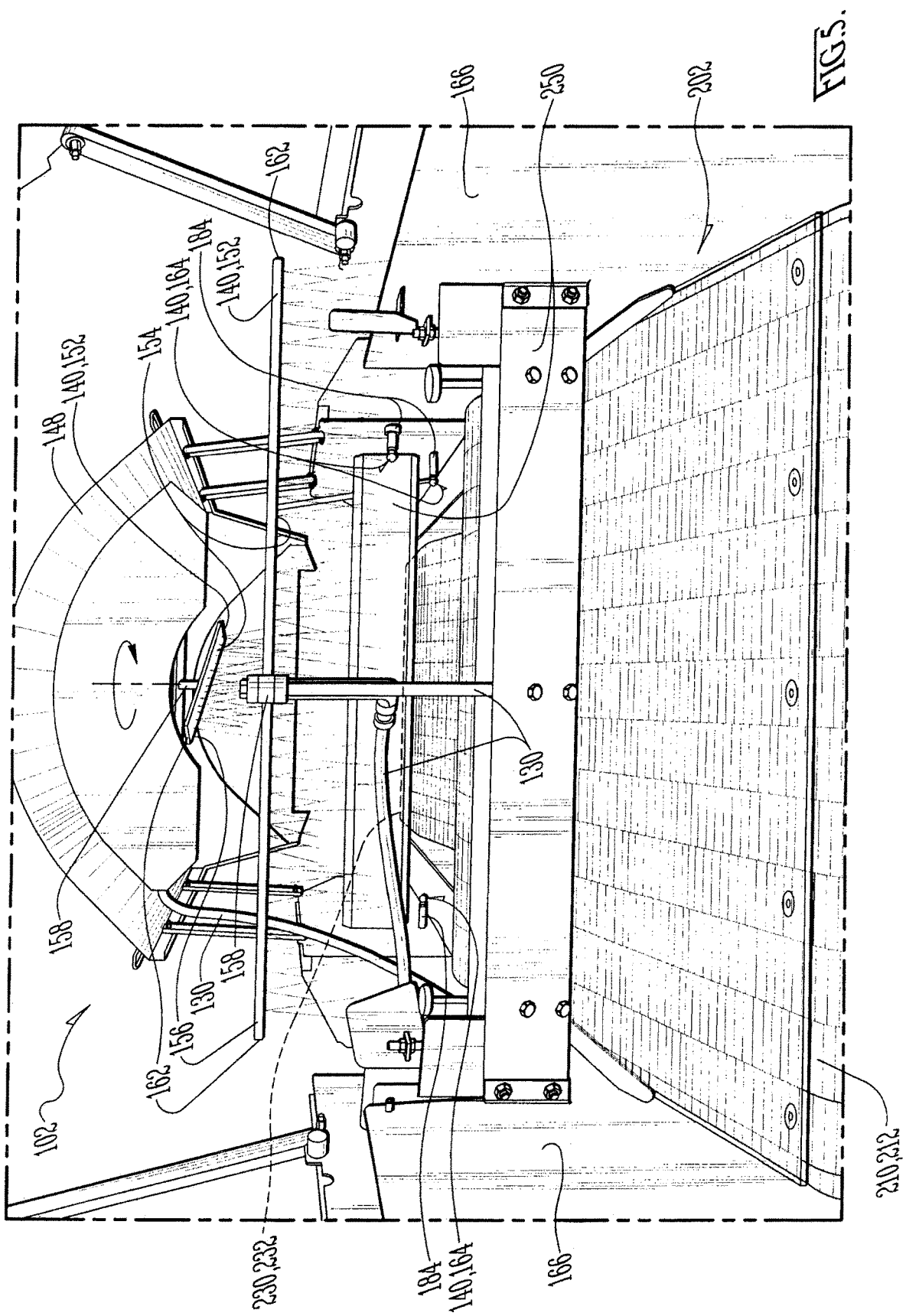

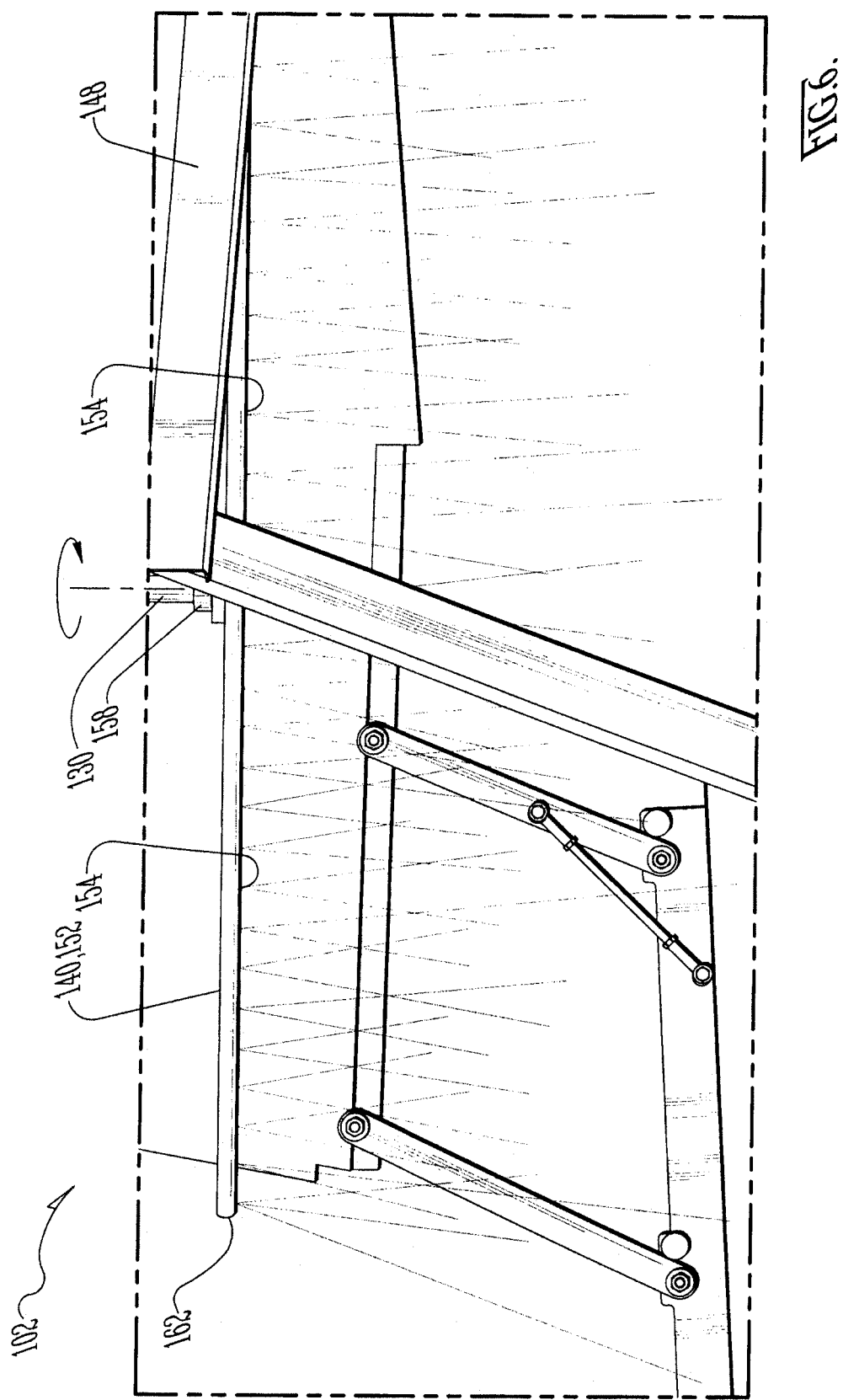

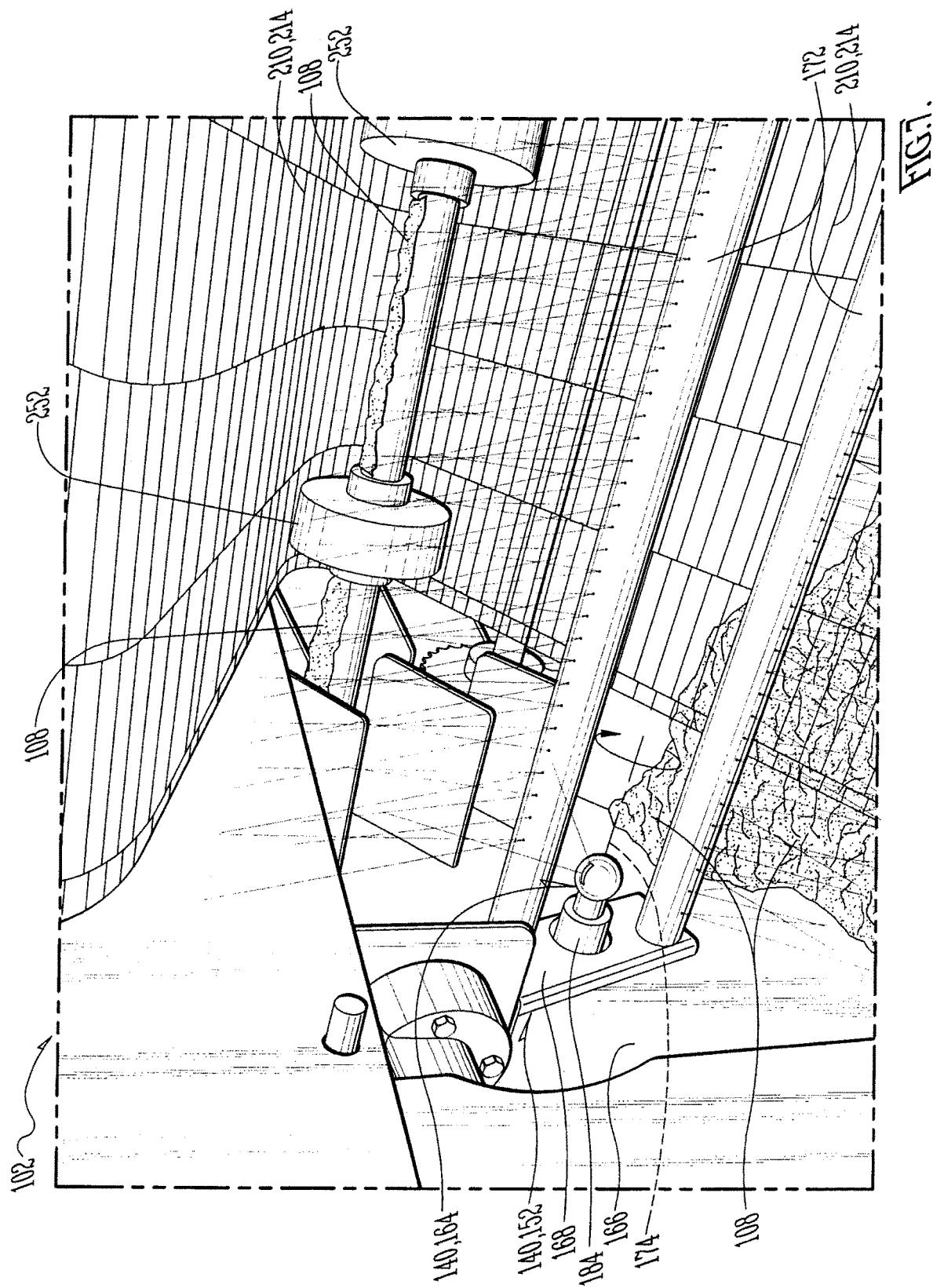

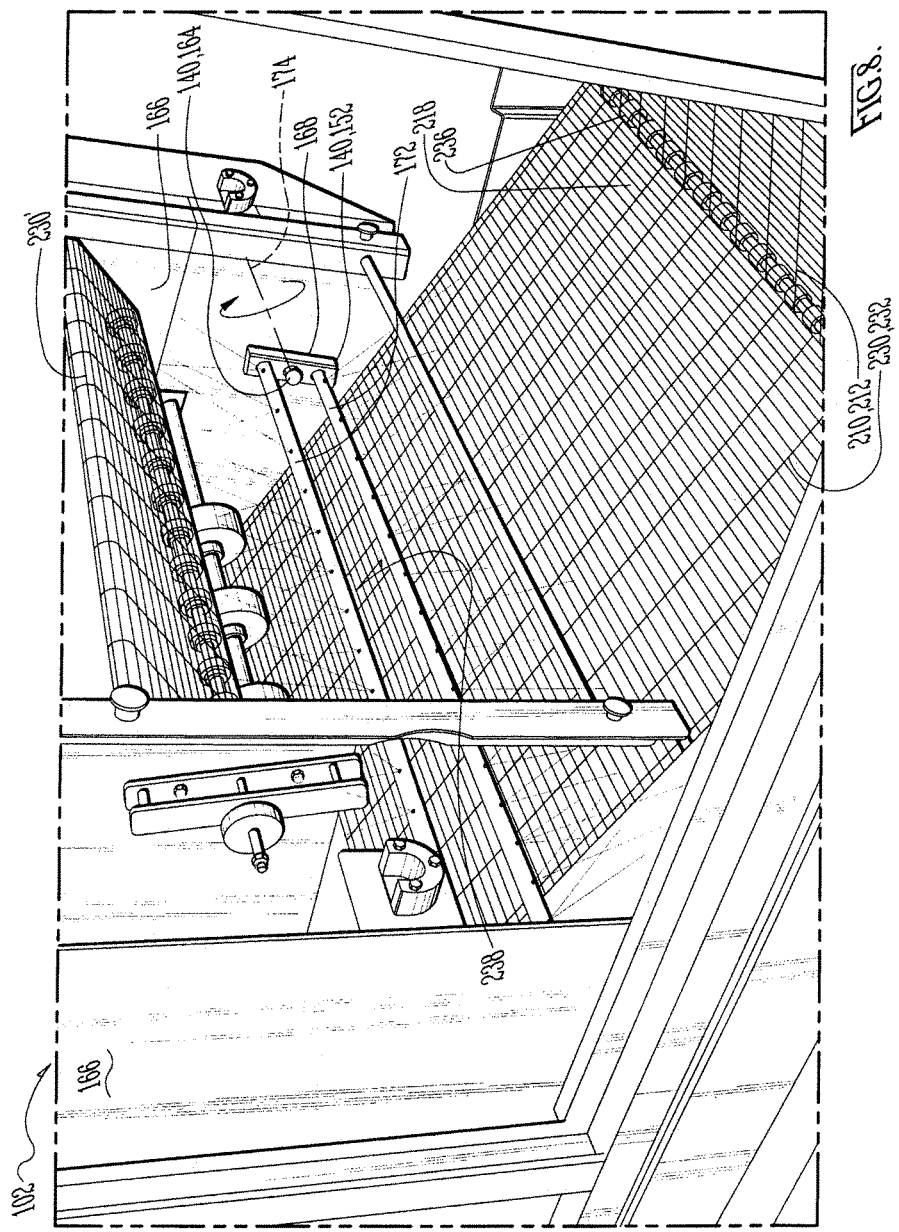

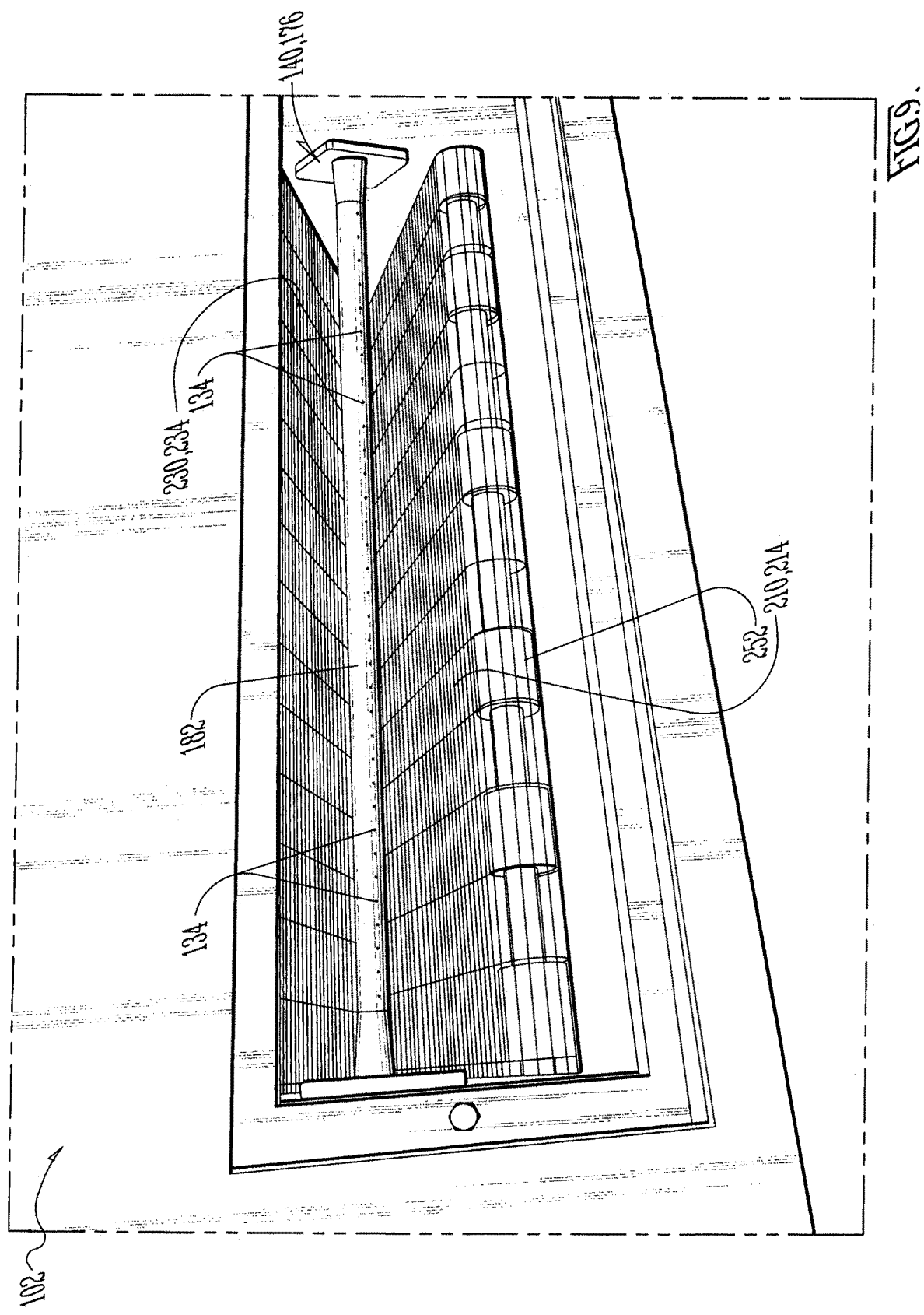

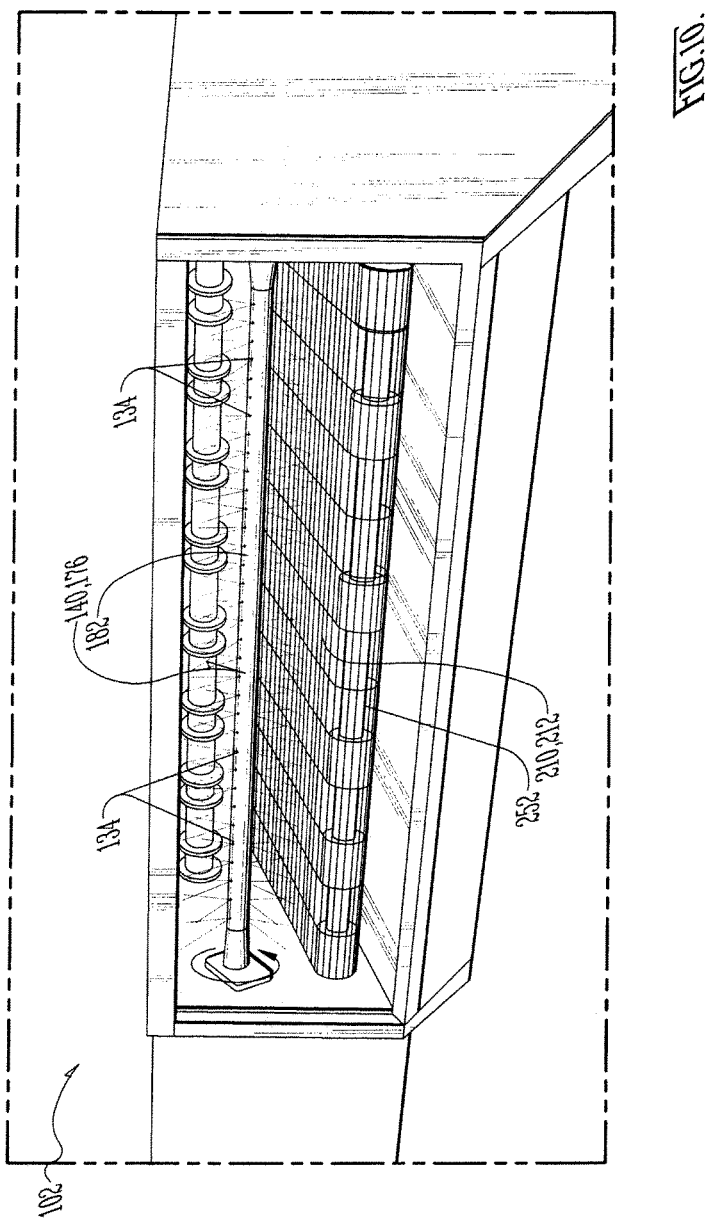

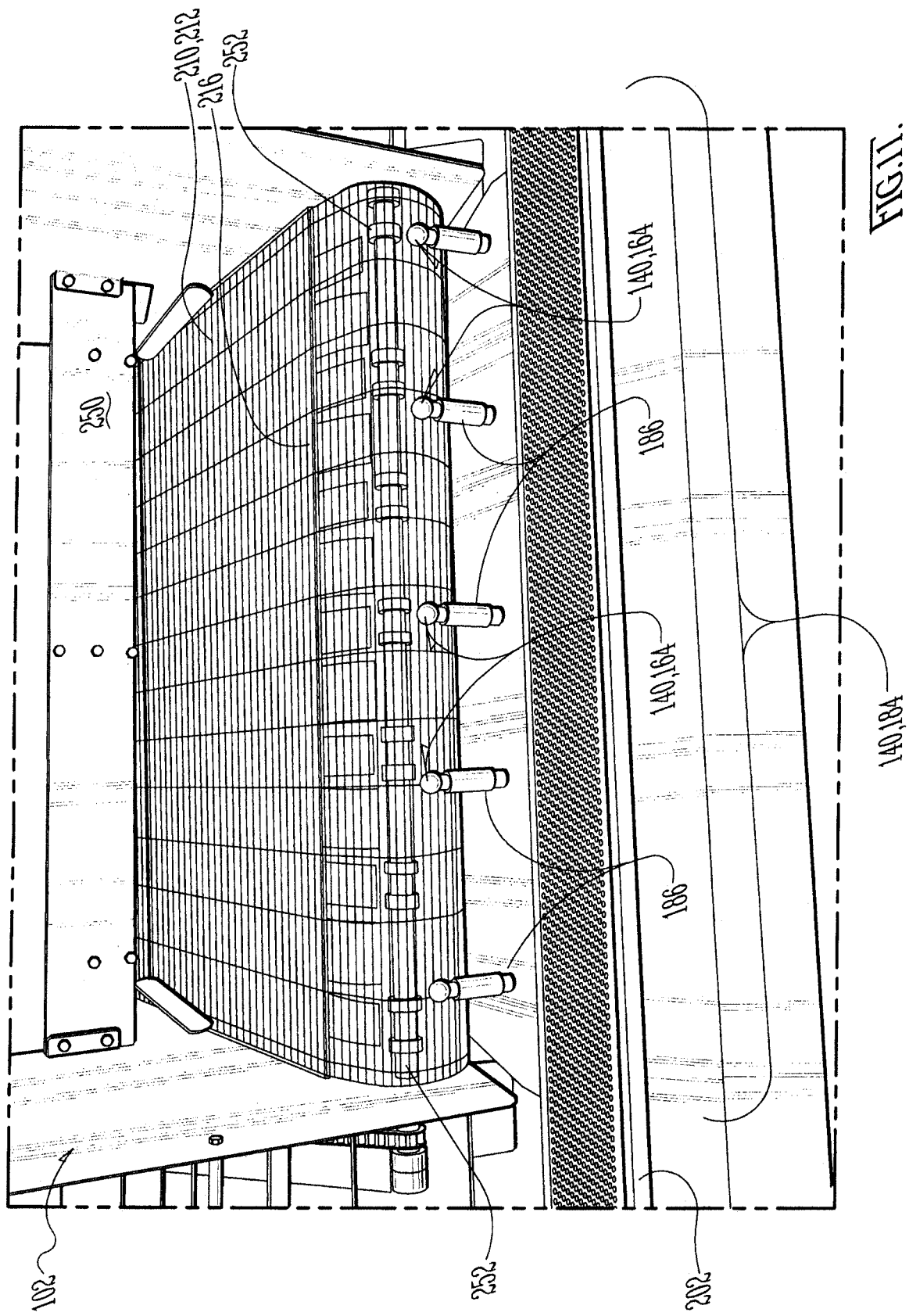

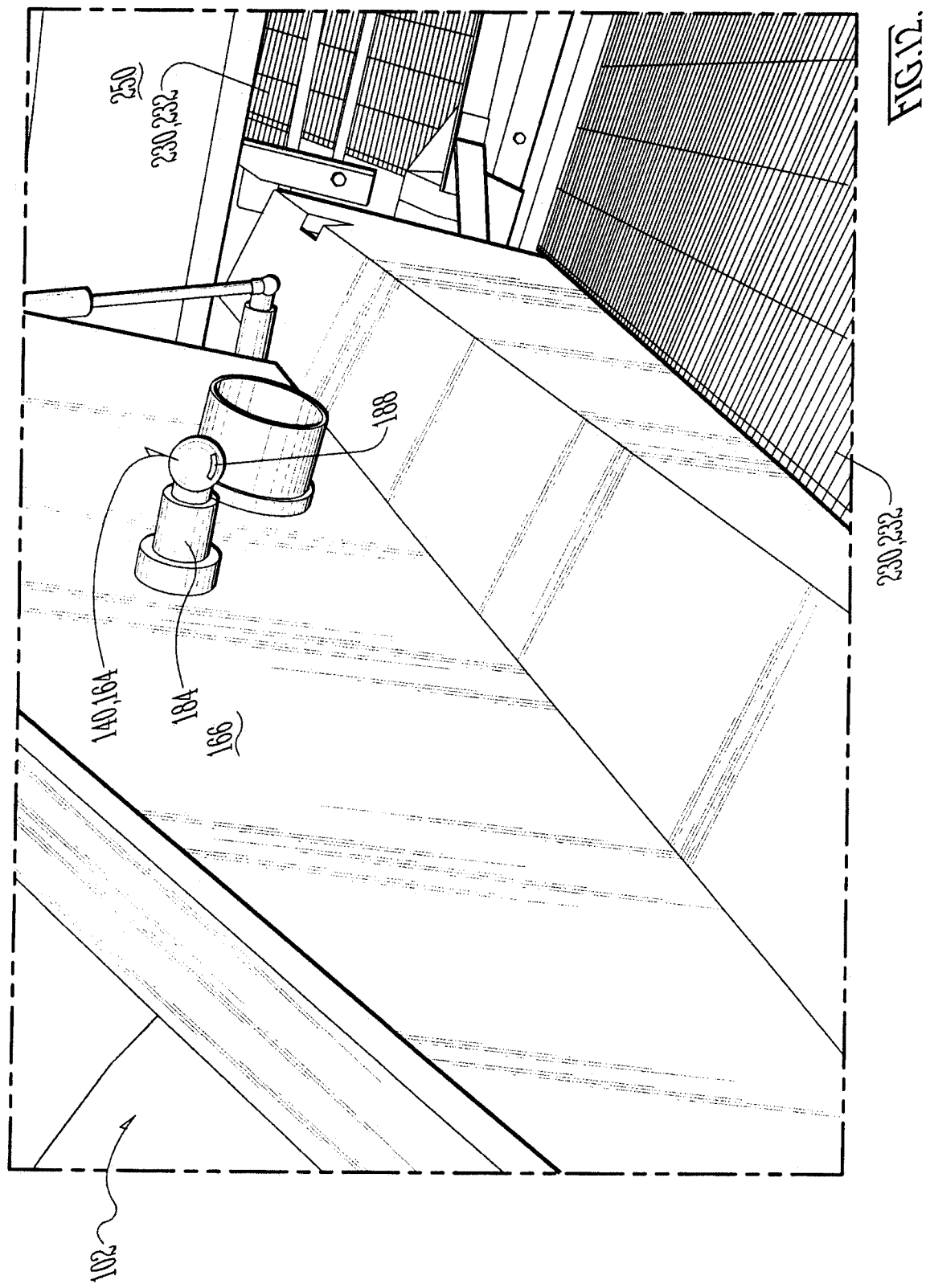

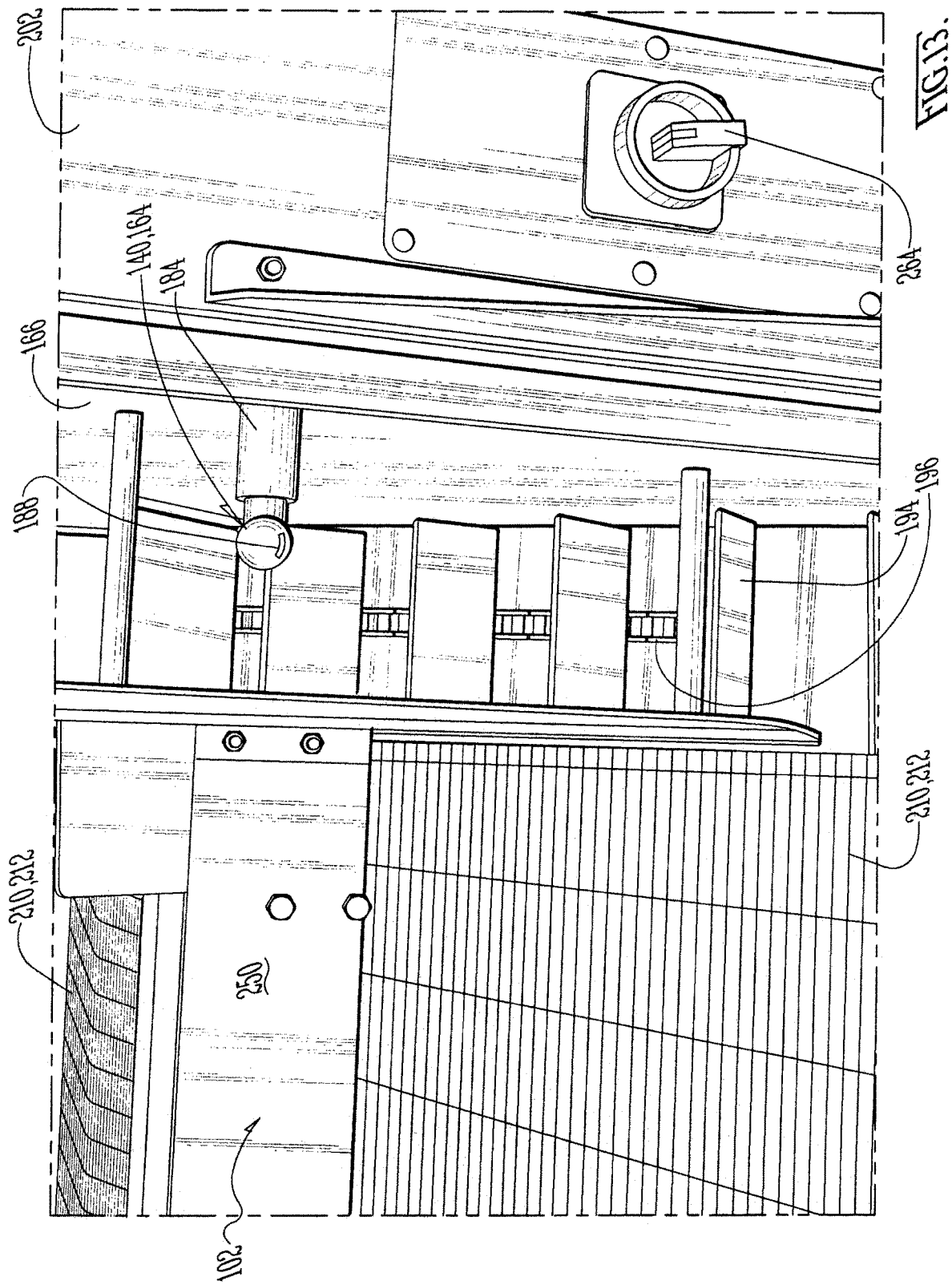

INTERNAL WASHING PROVISIONS FOR FOOD PROCESS LINE MACHINES

CROSS-REFERENCE TO RELATED APPLICATION(S)

This application claims the benefit of U.S. Provisional Application No. 62/866,124, filed Jun. 25, 2019.

This application is also a continuation-in-part of U.S. patent application Ser. No. 15/940,003, filed Mar. 29, 2018, now U.S. Pat. No. 10,889,444; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

The foregoing patent disclosure(s) is(are) incorporated herein by this reference thereto.

BACKGROUND AND SUMMARY OF THE INVENTION

The invention generally relates to automatic and/or mechanized food-process line equipment and, more particularly, to internal washing provisions for such food process line machines.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 5 is an isometric view of a given model of dry-particulate coating apparatus which will be shown consistently among FIGS. 5 through 13, and which view is looking in through the intake end for food-product pieces, along the central axis of this coating machine, as well as from a plane above the food-product carrying upper run of the intake conveyor, with the hood opened up, and showing a rotary spray head in accordance with the invention which might optionally be provisioned with a multitude of flat spray nozzles mounted along the arms from hub to the outboard ends thereof;

FIG. 6 is an isometric view of the upper rotary spray head in FIG. 5 shown during a washing operation, wherein this vantage point is to one side of the coating apparatus;

FIG. 7 is an isometric view showing (1) not only a spherical spray nozzle in accordance with the invention mounted in a fixed position on an interior sidewall of the coating apparatus, (2) but also a rotary frame of two spaced parallel manifold tubes in accordance with the invention that rotate about a common axis between the two manifold tubes;

FIG. 8 is an isometric view of a rotary frame comparable to FIG. 7 and which has two spaced parallel manifold tubes that rotate about a common axis between the two, shown during a wash operation;

FIG. 9 is an isometric view of a tubular (cylindrical) rotary manifold in accordance with the invention with multiple ports or nozzles distributed at spaced locations on its outer sidewall (eg., skin), and as shown during (or perhaps just after) a wash operation;

FIG. 10 is an isometric view comparable to FIG. 9 and showing the tubular (cylindrical) rotary manifold in accordance with the invention with multiple ports or nozzles distributed at spaced locations on its outer sidewall (eg., skin), and as definitely shown during a wash operation;

FIG. 11 is an isometric view of a series of columnar pickets in accordance with the invention, and each columnar picket carrying a spherical spray nozzle in accordance with the invention like in FIG. 7, which spherical spray nozzle might optionally have flat-spray apertures and/or be rotary or oscillating;

FIG. 12 is an isometric view of a spherical spray nozzle in accordance with the invention like in FIGS. 7 and 11, mounted in an interior sidewall of the coating apparatus above either the food-product carrying upper run of the outflow conveyor, and which spherical spray nozzle might optionally have flat-spray apertures and/or be rotary or oscillating; and FIG. 13 is an isometric view of a spherical spray nozzle in accordance with the invention like in FIGS. 7, 11 and 12, mounted in an interior sidewall of the coating apparatus above an elevator conveyor in the coating material recirculation system which flanks the upper food-product carrying run of the intake conveyor, and which spherical spray nozzle might optionally have flat-spray apertures and/or be rotary or oscillating.

DETAILED DESCRIPTION OF THE PREFERRED EMBODIMENTS

FIGS. 1 through 4 show a series 100 of mechanized food-process line equipment 204, 102' and 206 arranged in such a working food process line 100 and furnished with internal washing provisions 110 in accordance with the invention for the food process line machines 102 in accordance with the invention.

Figure 1:
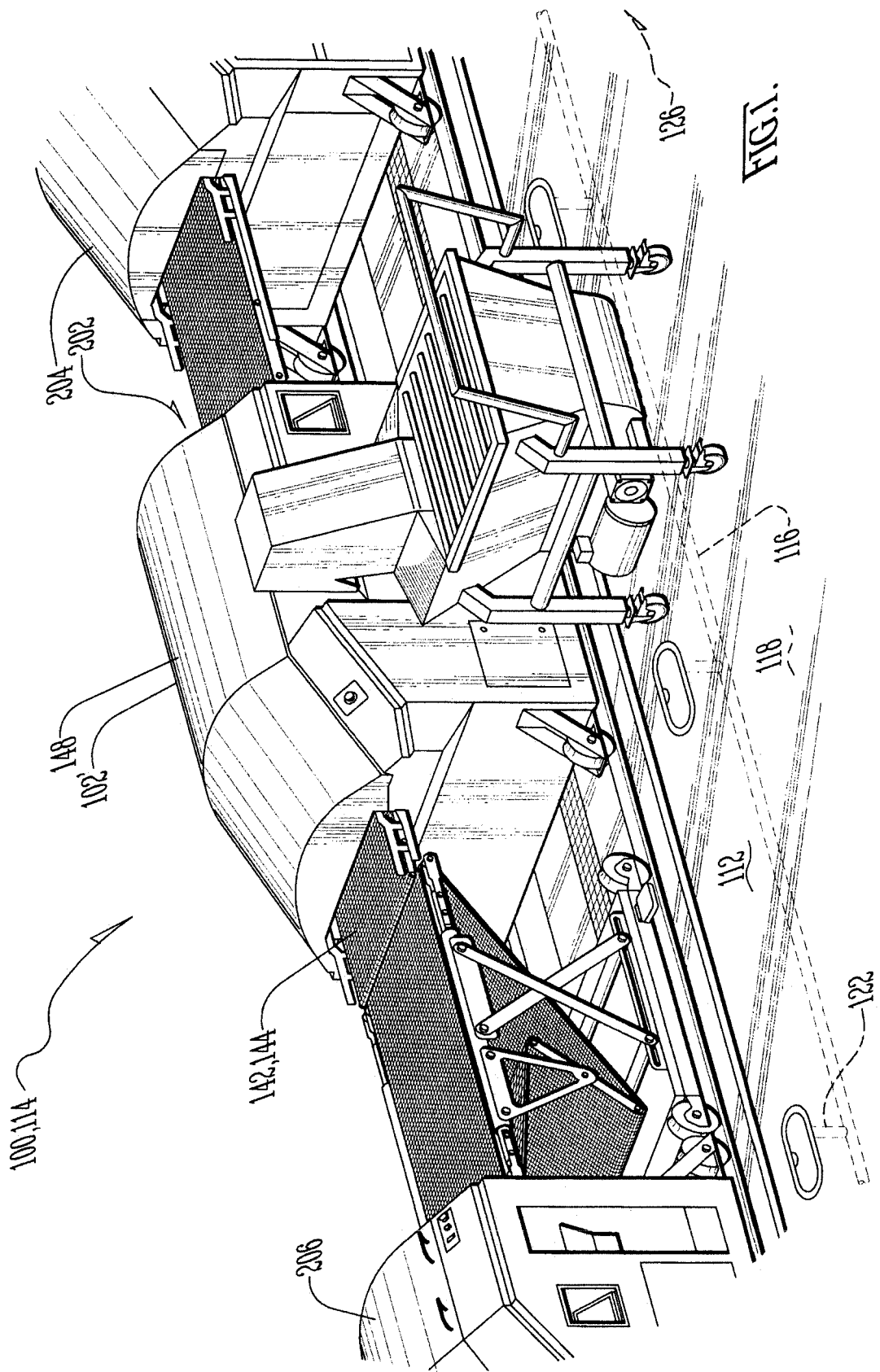
FIG. 1 is a perspective view of mechanized food-process line equipment arranged in a working food process line and furnished with internal washing provisions in accordance with the invention for food process line machines of which this illustrated one is a non-limiting example of such machines.

FIG. 1 shows a series 100 of food process line machines 204, 102' and 206 configured in a non-limiting example of a working food process line 100. The floor 112 of the plant 114 has cleaning-fluid supply lines 116 below the ground 118 level of the plant 114, with spaced provisions 122 to hook-up hose 124 or other suitable conduits 124 between the cleaning fluid supply 126 and a particular machine 204, 102' or 206.

Figure 2:
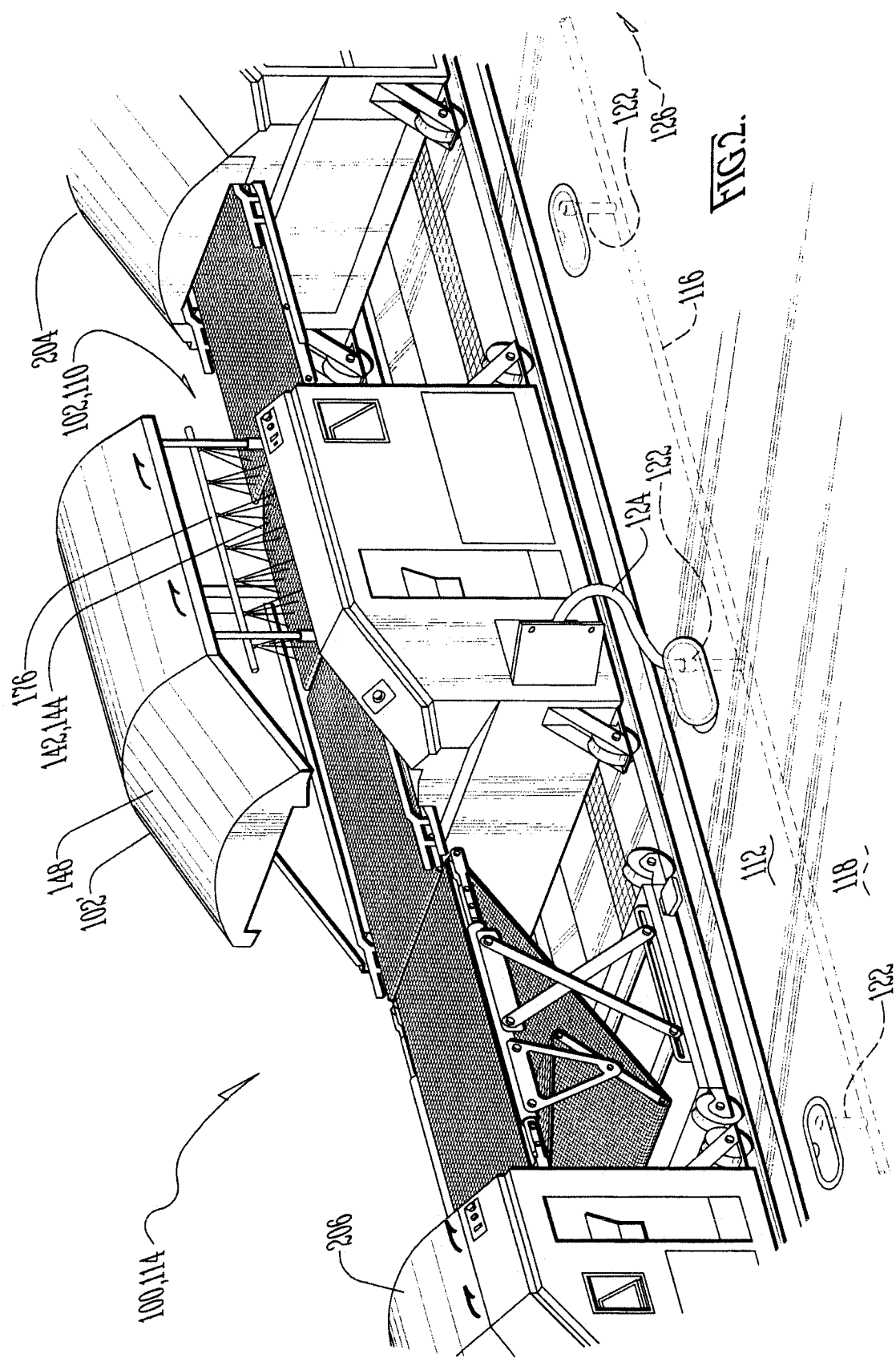
FIG. 2 is a perspective view comparable to FIG. 1, perhaps of a slightly different model of dry-particulate coating apparatus, and also being a differing view by showing the hoods and/or various panels opened-up (or deployed open) for cleaning operations.

FIG. 2 shows machine 102', this perhaps being a coating machine for a dry-coating material 108 such as seasoned flour, or spices, or Panko crumb and so on. The machine 102' is opened up for cleaning operations. The machine 102' opens itself upon a given control 128 instruction. A worker (not shown) has taken a flexible hose 124 and coupled the machine 102' to the machine's internal cleaning-fluid circuit 130 with the in-ground cleaning-fluid supply lines 116.

Figure 3:
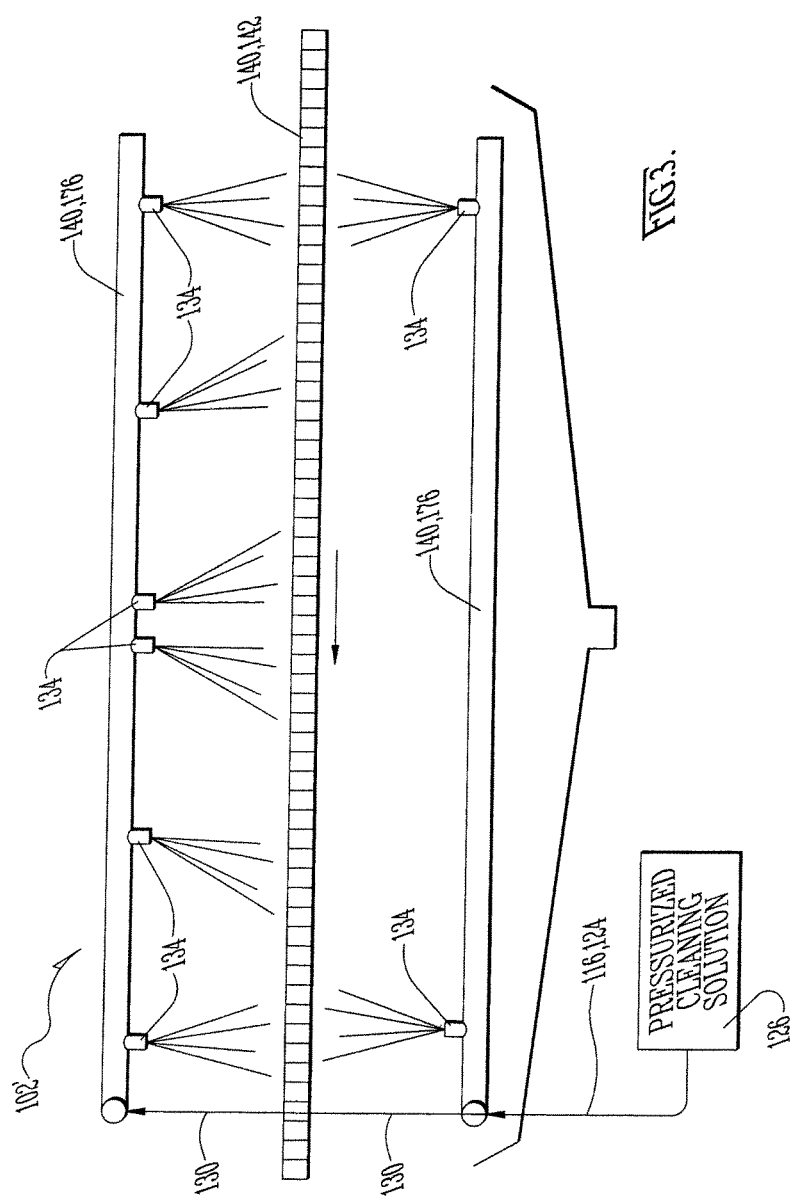
FIG. 3 is a schematic side elevation view of FIG. 2.
Figure 4:
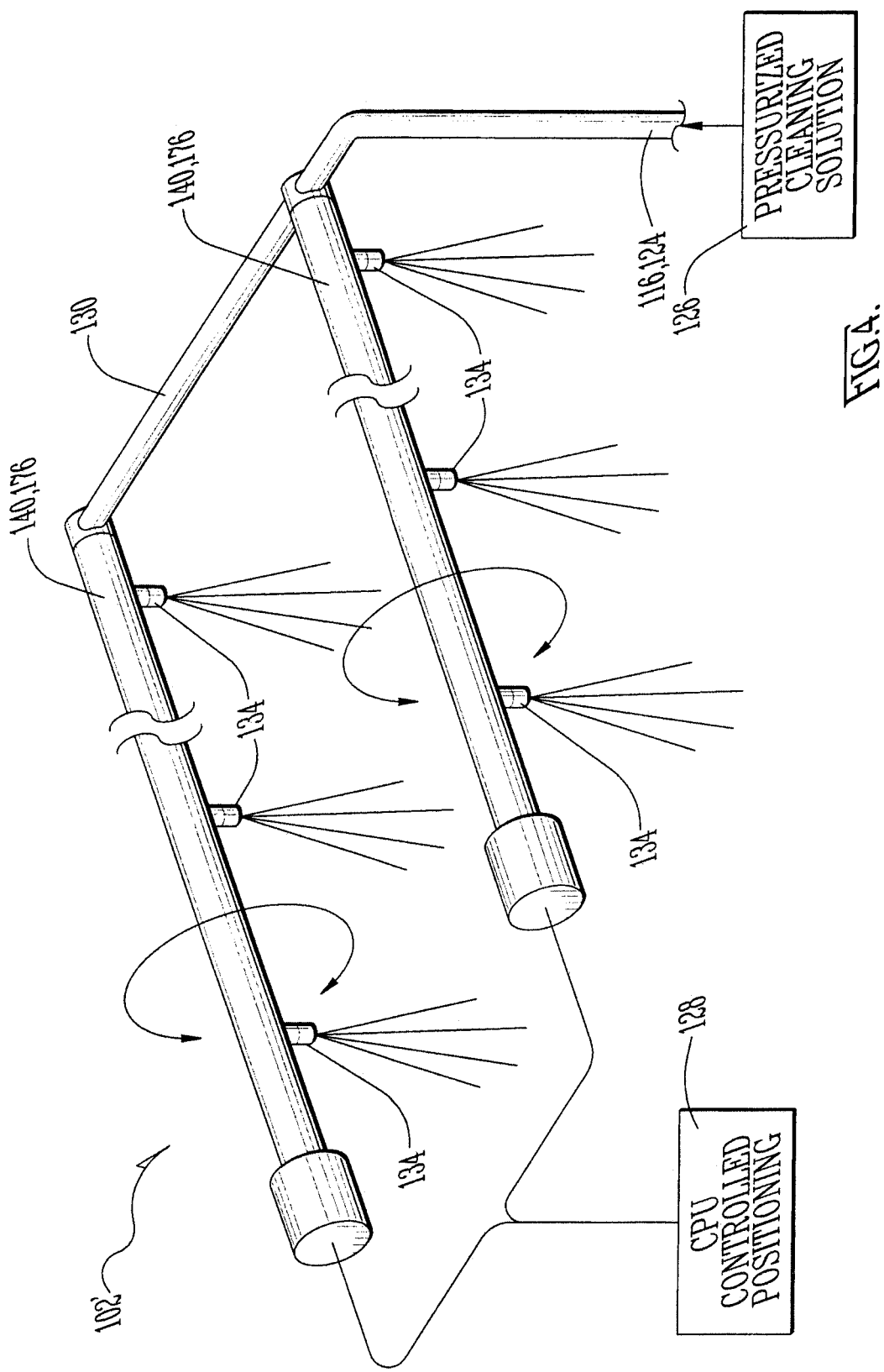
FIG. 4 is a schematic perspective view of FIG. 3.

FIGS. 3 and 4 show a representation of the internal cleaning-fluid circuit 130 of machine 102', albeit schematically. An array of jet nozzles 134 are permanently retained within the machine 102', in both the opened up state as shown by FIG. 2, or the closed state for operation as shown by FIG. 1. The nozzles 134 are strategically aimed and agitated to accomplish targeted cleaning without the variance of human operators. Again, FIG. 4 shows that preferably, the nozzles 134 are not static but can be driven in some motion.

FIGS. 5-13 comprise a series of views showing the strategic distribution of spraying provisions 140 within a given model of dry-particulate coating apparatus 102, which machine 102 is the same machine 102 among FIGS. 5 through 13 and will be shown consistently among FIGS. 5 through 13.

FIG. 5 is an isometric view through the intake end 202 of the machine 102, along the central axis of this coating machine 102, and from a plane above the food-product carrying upper run 212 of the intake conveyor 212, with the hood 148 opened up, and showing a rotary spray head 152 in accordance with the invention which might optionally be provisioned with a multitude of flat spray nozzles 154 mounted along the arms 156 from hub 158 to the outboard ends 162 thereof.

FIG. 6 is an isometric view of the rotary spray head 152 in FIG. 5 shown during a washing operation, wherein this vantage point is to one side of the coating apparatus 102.

FIG. 7 is an isometric view looking at the lower return run 214 of the intake conveyor 210, showing (1) not only a spherical spray nozzle 164 in accordance with the invention mounted in a fixed position on an interior sidewall 166 of the coating apparatus 102, (2) but also a rotary frame 168 of two spaced parallel manifold tubes 172 in accordance with the invention that rotate about a common axis 174 between the two tubes 172.

This rotary frame 168 might be alternatively referred to as a barrel turbine 168 and the tubes 172 might be alternatively referred to as vanes 172.

FIG. 8 is an isometric view looking at the upper food-product carrying run 232 of the outflow conveyor 230, and showing a rotary frame 168 comparable to in FIG. 7 which has two spaced parallel manifold tubes 172 that rotate about a common axis 174 between the two tubes 172, shown during a wash operation.

FIG. 9 is looking at where the lower return run 214 of the intake conveyor 210 extends under a portion of the lower return run 234 of the outflow conveyor 230 proximate the receiving end 236 (not shown in the view, but see FIG. 8). Thus FIG. 9 is an isometric view of a tubular (cylindrical) rotary manifold 176 in accordance with the invention. Such a tubular (cylindrical) rotary manifold 176 was shown previously in FIGS. 2-4. The tubular (cylindrical) rotary manifold 176 is provided with multiple ports or nozzles 134 distributed at spaced locations on its outer sidewall 182 (eg., skin), and as shown during (or perhaps just after) a wash operation.

Wherein above it was mentioned in connection with FIG. 4 that, preferably the nozzles 134 are not static but can be driven in some motion. More accurately, the tubular (cylindrical) rotary manifold 176 is driven in rotary or oscillating motion by CPU controlled positioning means.

FIG. 10 is an isometric view comparable to FIG. 9 except from a shifted viewpoint and wherein the outflow conveyor 230 is no longer in view, having likely been elevated up and out of the view. FIG. 10 again shows the tubular (cylindrical) rotary manifold 176 in accordance with the invention with multiple ports or nozzles 134 distributed at spaced locations on its outer sidewall 182 (eg., skin), and as definitely shown during a wash operation.

FIG. 11 is an isometric view looking at the intake end 216 of intake conveyor 210 shown with a series of columnar pickets 184 in accordance with the invention aimed at the intake end 216 and the nose roller 252 therefor. Each columnar picket 184 has a column 186 carrying a spherical spray nozzle 164 in accordance with the invention like in FIG. 7, which spherical spray nozzle 164 might optionally have flat-spray apertures 188 and/or be rotary or oscillating.

FIG. 12 is an isometric view looking into the interior of the coating apparatus 102, and looking down the outflow conveyor 230 to where its receiving end 236 receives coated food-product from the discharge end 218 of the inflow conveyor. The interior sidewall 166 of the machine 102 is provided with a spherical spray nozzle 164 in accordance with the invention like in FIGS. 7 and 11. The spherical spray nozzle 164 here is mounted again on a column 186, mounted on the interior sidewall 166 of the coating apparatus 102 above upper food-product carrying run 232 of the outflow conveyor 230, proximate where the transfer of coated food product takes place proximate the discharge end 218 of the outflow conveyor 201 and receiving end 236 of the outflow conveyor 230. The spherical-spray nozzle 164 might optionally have flat-spray apertures 188 and/or be rotary or oscillating.

FIG. 13 is an isometric view looking up and to the right relative FIG. 11, and showing spherical spray nozzle 164 in accordance with the invention like in FIGS. 7, 11 and 12, mounted in an interior sidewall 166 of the coating apparatus 102 above an elevator conveyor 194 in the coating material recirculation system 196 which flanks the intake conveyor 210, and which spherical spray nozzle 164 might optionally have flat-spray apertures 188 and/or be rotary or oscillating.

These and other aspects and objects are provided according to the invention in accordance with the following exemplary, non-limiting characterizations.

That is, in accordance with a first characterization of an improvement for food process-line 100 coating apparatus 102 for coating 108 a stream of food product, said food process-line coating apparatus 102 can be characterized by having:

an intake 210 conveyor having an upper food-product carrying run 212 and a lower return run 214, and extending between an intake end 216 for intake of a food product stream from upline processes 204 in said food process-line 100 and a discharge end 218 for discharge of the food product stream either to a direct destination 230 or 230' within said coating apparatus 102 or else to downline processes 206;

an overhead coating material dispenser 250 for dispensing coating material 108 on underpassing food product on the upper food-product carrying run 212 of the intake conveyor 210; and an outflow conveyor 230 having an upper food-product carrying run 232 and a lower return run 234, and extending between a receiving end 236 for receipt of a food product stream from a source 210 within said coating apparatus 102 and a discharge end 238 for discharge of the food product stream to a downline process 206 in said food-process line 100;

said improvement comprising:
a permanently-installed internal cleaning-fluid circuit 130 and a plurality cleaning-fluid distribution devices 140 comprising one of:
   a rotary spray head 152;
   a spherical spray nozzle 164;
   a rotary frame 168; or
   tubular (cylindrical) rotary manifold 176;
whereby during run operations the permanently-installed internal cleaning-fluid circuit 130 and the plurality cleaning-fluid distribution devices 140 are turned OFF (eg., 128 and/or 264), but during down time the permanently-installed internal cleaning-fluid circuit 130 and the plurality cleaning-fluid distribution devices 140 are switched ON (eg., 128 and/or 264).

In accordance with a second characterization, the improvement in accordance with a first characterization can be further characterized by, wherein:
the rotary spray head 152 further comprises being provisioned with a multitude of flat spray nozzles 154 mounted along the arms 156 from hub 158 to the outboard ends 162 thereof.

In accordance with a third characterization, the improvement in accordance with a first characterization can be further characterized by, wherein:
the spherical spray nozzle 164 further comprises a columnar base 186;
wherein a plurality 184 of columnar bases 186 and spherically spray nozzles 164 are arranged in a picket 184 and aimed at some select laterally-extending target 252 in said food process-line 100 coating apparatus 102.

In accordance with a fourth characterization, the improvement in accordance with a third characterization can be further characterized by, wherein:
the target 252 comprises a laterally-extending nose roller 252 for a conveyor belt (eg., 210 or 230).

In accordance with a fifth characterization, the improvement in accordance with a first characterization can be further characterized by, wherein:
the rotary frame 168 further comprises a spaced pair of parallel manifold tubes 172 that rotate about a common axis 174 between the two tubes 172.

In accordance with a sixth characterization, the improvement in accordance with a first characterization can be further characterized by, wherein:
the tubular (cylindrical) rotary manifold 176 further comprises multiple ports or nozzles 134 distributed at spaced locations on its outer sidewall 182.

In brief, food process-line 100 coating apparatus 102 for coating 108 a stream of food product in a food process line 100 are provided with the improvement of a permanently-installed internal cleaning-fluid circuit 130 and a plurality cleaning-fluid distribution devices 140 (eg., 152, 164, 168, 176, 184). The cleaning-fluid distribution devices 140 (eg., 152, 164, 168, 176, 184) are any of a rotary spray head 152, a spherical spray nozzle 164, a rotary frame 168 or a tubular (cylindrical) rotary manifold 176. The rotary spray head 152 optionally has a multitude of flat spray nozzles 154 mounted along the arms 156. The spherical spray nozzle 164 might be mounted on a columnar base 186, and a plurality 184 of those might stand like pickets 184 and aimed at a laterally-extending target 252, like a nose roller 252 of a conveyor belt (eg., 210 or 230). The rotary frame 168 might have a spaced pair of parallel manifold tubes 172 that rotate about a common axis 174. The tubular (cylindrical) rotary manifold 176 preferably has a multitude of ports or nozzles 134 distributed at spaced locations on its outer sidewall 182.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. An improvement for a food process-line coating apparatus in an automatic mechanized food-process line and which food process-line coating apparatus provides service for coating a stream of food product with a dry-particulate coating material between an upline process and a downline process in said automatic mechanized food-process line, said food process-line coating apparatus comprising:
   an intake conveyor having an upper food-product carrying run and a lower return run, and extending between an intake end for intake of a food product stream from upline processes in said food process-line and a discharge end for discharge of the food product stream either to a direct destination within said coating apparatus or else to downline processes;
   an overhead coating material dispenser for dispensing coating material on underpassing food product on the food-product carrying run of the intake conveyor; and
   an outflow conveyor having an upper food-product carrying run and a lower return run, and extending between a receiving end for receipt of a food product stream from a source within said coating apparatus and a discharge end for discharge of the food product stream to a downline process in said food-process line;
   said improvement comprising:
   a permanently-installed internal cleaning-fluid circuit and a plurality cleaning-fluid distribution devices comprising one fluid distribution device selected from a selection of:
      a rotary spray head;
      a spherical spray nozzle;
      a rotary frame; or
      a tubular rotary manifold; and
   another fluid distribution device selected from the selection of, but different from the one fluid distribution device:
      a rotary spray head;
      a spherical spray nozzle;
      a rotary frame; or
      a tubular rotary manifold;
   whereby during coating operations when the food product stream is being conveyed from the intake end of the intake conveyor to the discharge end of the outflow conveyor and being coated by coating material, the permanently-installed internal cleaning-fluid circuit and the plurality cleaning-fluid distribution devices are in an off state; but after coating operations and the food product stream is no longer passing onto the intake end of the intake conveyor, the permanently-installed internal cleaning-fluid circuit and the plurality cleaning-fluid distribution devices are available for cleaning operations such that under a given control instruction the permanently-installed internal cleaning-fluid circuit and the plurality cleaning-fluid distribution devices switch to a cleaning-operation state.

2. The improvement of claim 1 wherein:
   the rotary spray head comprises a hub and at least two elongated arms extending from the hub to respective outboard ends; and the rotary spray head further comprises being provisioned with a multitude of flat spray nozzles mounted along the arms from the hub to the outboard ends thereof.

3. The improvement of claim 1 wherein:
the spherical spray nozzle further comprises a columnar base;
wherein a plurality of columnar bases and spherically spray nozzles are arranged in a picket and aimed at some select laterally-extending target in said food process-line coating apparatus.

4. The improvement of claim 3 wherein:
the target comprises a laterally-extending nose roller for a conveyor belt.

5. The improvement of claim 1 wherein:
the rotary frame further comprises a spaced pair of parallel manifold tubes that rotate about a common axis between the two tubes.

6. The improvement of claim 1 wherein:
the tubular rotary manifold further comprises an outer sidewall and multiple ports or nozzles distributed at spaced locations on the outer sidewall.

7. The improvement of claim 1 wherein:
the food process-line coating apparatus further comprises a hood positionable between at least two states comprising a closed state for coating operations and an open state for cleaning operations.

8. The improvement of claim 7 wherein:
the one of:
 the rotary spray head;
 the spherical spray nozzle;
 the rotary frame; or
 the tubular rotary manifold;
is mounted to the hood that is positionable between at least two states comprising a closed state for coating operations and an open state for cleaning operations.

9. The improvement of claim 1 wherein:
the source within said coating apparatus is either discharge end of the intake conveyor or else an other direct destination within said coating apparatus.

* * * * *